United States Patent
Aratani

Patent Number: 5,305,034
Date of Patent: Apr. 19, 1994

[54] CAMERA SHOULDER REST HAVING A MATRIX OF SPRING CONNECTED PLATES FOR CUSHIONING SUPPORT

[76] Inventor: Lance I. Aratani, 102 Hillside Drive, Old Hickory, Tenn. 37138

[21] Appl. No.: 47,980

[22] Filed: Apr. 19, 1993

[51] Int. Cl.$^5$ .................. G03B 17/00; G03B 29/00
[52] U.S. Cl. .................. 354/82; 354/293; 352/243; 248/187; 224/265; 224/908
[58] Field of Search ........... 354/81, 82, 293; 352/243; 358/229; 224/265, 908; 248/187

[56] References Cited

U.S. PATENT DOCUMENTS

| | | | |
|---|---|---|---|
| 2,370,611 | 2/1945 | DuMais | 354/293 X |
| 3,557,679 | 1/1971 | Spoerl | 354/293 |
| 4,514,067 | 4/1985 | Gallegos et al. | 354/293 |
| 4,963,904 | 10/1990 | Lee | 354/82 |
| 5,005,030 | 4/1991 | Wells | 354/82 |
| 5,073,788 | 12/1991 | Lingwall | 354/81 |

*Primary Examiner*—Michael L. Gellner
*Assistant Examiner*—J. K. Han
*Attorney, Agent, or Firm*—Leon Gilden

[57] ABSTRACT

A shoulder rest member includes a support plate having a rotatable fastener directed orthogonally therethrough for securement to a camera base, with the rest structure further including a connecting plate orthogonally mounted to the support plate, with the connecting plate extending from the support plate to an arcuate saddle plate, having a concave support surface for accommodating an individual's shoulder thereon. The camera member is arranged for rotative mounting upon the support plate. A matrix of spring connected plates are optionally provided for spring mounting to the concave support.

1 Claim, 4 Drawing Sheets

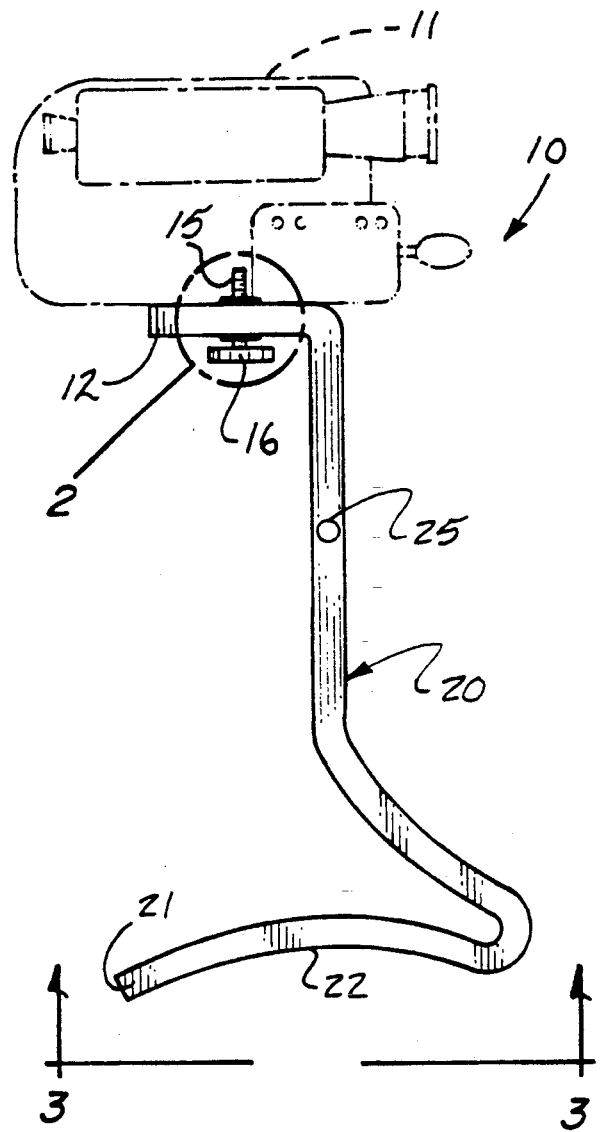
Fig. 1
Fig. 2
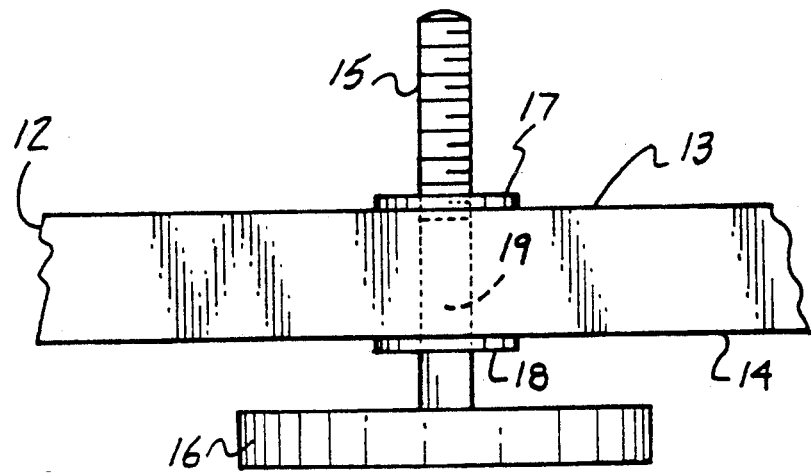

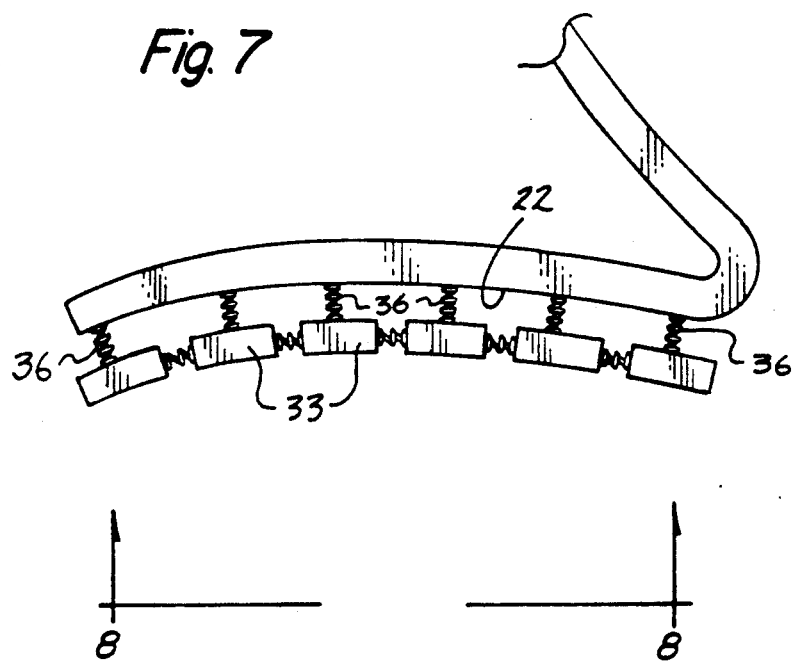
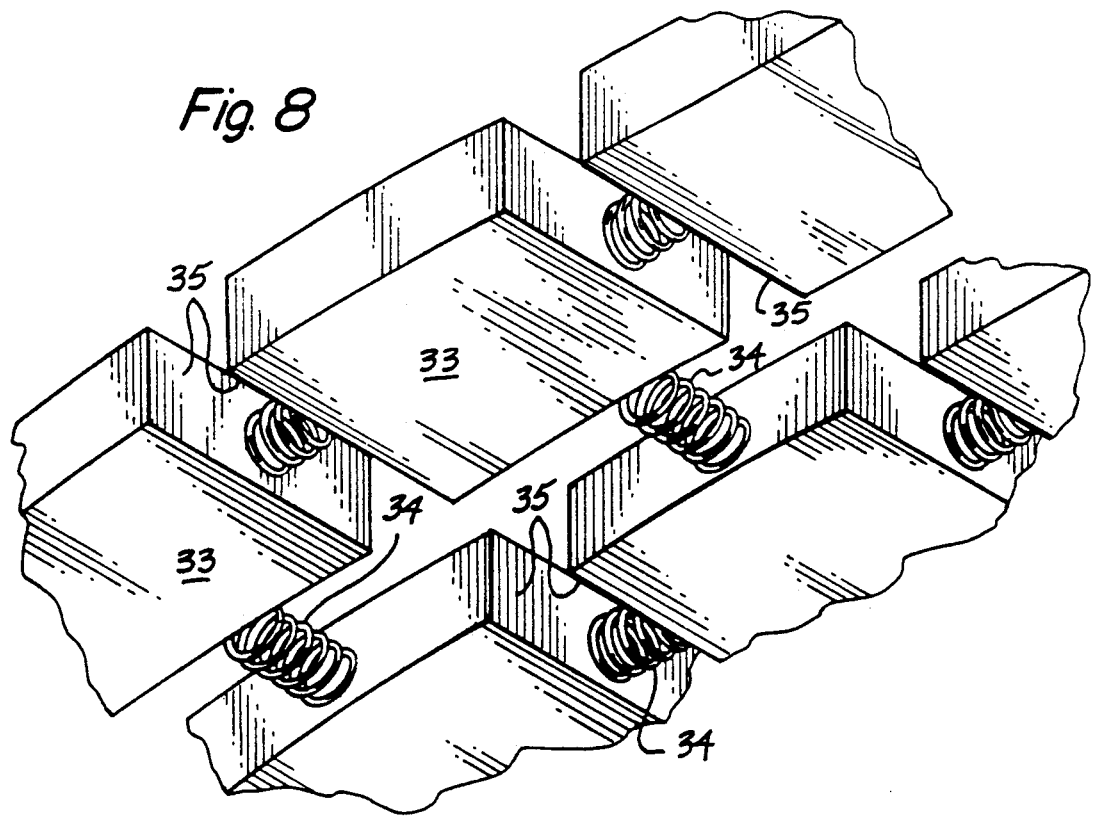

CAMERA SHOULDER REST HAVING A MATRIX OF SPRING CONNECTED PLATES FOR CUSHIONING SUPPORT

BACKGROUND OF THE INVENTION

1. Field of the Invention

The field of invention relates to camera support apparatus, and more particularly pertains to a new and improved camera shoulder rest wherein the same is arranged to accommodate an individual camera in a rotative relationship relative to a shoulder of an individual.

2. Description of the Prior Art

Various support structure is available in the prior art to accommodate a camera for its ease of positioning and imparting stability during use. Such structure is exemplified in the U.S. Pat. Nos. 4,991,758; 5,038,160; 4,895,286; 5,073,788; and 4,963,904.

The instant invention attempts to overcome deficiencies of the prior art by providing for a camera shoulder rest wherein the same is arranged to permit ease of mounting and dismounting relative to an individual's shoulder and rotatably mounting the camera for use and in this respect, the present invention substantially fulfills this need.

SUMMARY OF THE INVENTION

In view of the foregoing disadvantages inherent in the known types of shoulder rest apparatus now present in the prior art, the present invention provides a camera shoulder rest wherein the same includes an arcuate saddle arranged to accommodate an individual's shoulder therein. As such, the general purpose of the present invention, which will be described subsequently in greater detail, is to provide a new and improved camera shoulder rest which has all the advantages of the prior art shoulder rest apparatus and none of the disadvantages.

To attain this, the present invention provides a shoulder rest member including a support plate having a rotatable fastener directed orthogonally therethrough for securement to a camera base, with the rest structure further including a connecting plate orthogonally mounted to the support plate, with the connecting plate extending from the support plate to an arcuate saddle plate, having a concave support surface for accommodating an individual's shoulder thereon. The camera member is arranged for rotative mounting upon the support plate.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved camera shoulder rest which has all the advantages of the prior art shoulder rest apparatus and none of the disadvantages.

It is another object of the present invention to provide a new and improved camera shoulder rest which may be easily and efficiently manufactured and marketed.

It is a further object of the present invention to provide a new and improved camera shoulder rest which is of a durable and reliable construction.

An even further object of the present invention is to provide a new and improved camera shoulder rest which is susceptible of a low cost of manufacture with regard to both materials and labor, and which accordingly is then susceptible of low prices of sale to the consuming public, thereby making such camera shoulder rests economically available to the buying public.

Still yet another object of the present invention is to provide a new and improved camera shoulder rest which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view of the invention.

FIG. 2 is an orthographic view of section 2 as set forth in FIG. 1.

FIG. 7 is an orthographic view of the saddle plate as indicated in FIG. 6.

FIG. 8 is an isometric illustration, taken along the lines 8—8 of FIG. 7 in the direction indicated by the arrows.

DESCRIPTION OF THE PREFERRED EMBODIMENT

Figure 3:
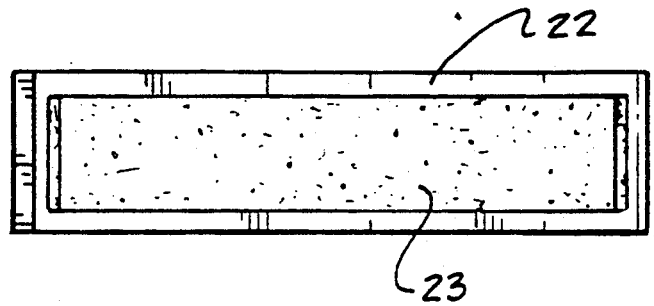
FIG. 3 is an orthographic view, taken along the lines 3—3 of FIG. 1 in the direction indicated by the arrows.

With reference now to the drawings, and in particular to FIGS. 1 to 8 thereof, a new and improved camera shoulder rest embodying the principles and concepts of the present invention and generally designated by the reference numeral 10 will be described.

More specifically, the camera shoulder rest 10 of the instant invention essentially comprises the mounting of a camera 11 upon a support plate 12, having a support plate top wall 13 spaced from and parallel a support plate bottom wall 14. A fastener rod 15 is rotatably received through a support plate bore 19 orthogonally directed through the support plate and the support plate top and bottom walls 13 and 14 respectively. The fastener rod 15 includes a rod handle 16 at a first end of the fastener rod, with the fastener rod projecting beyond the support top wall 13 for securement into the associated camera 11, as indicated in FIG. 1. Respective first and second collars 17 and 18 fixedly mounted to the fastener rod 15 in adjacency to the respective top and bottom walls 13 and 14 rotatably fix the fastener rod 15 relative to the support plate.

A connecting plate 20 extends orthogonally from the support plate 12 to an arcuate saddle plate 21, with the connecting plate oriented medially of the saddle plate 21 between the support plate 12 and the saddle plate 21. A resilient pad 23 is mounted to a concave support surface 22 of the arcuate saddle plate 21 for accommodating an individual's shoulder therewithin.

Figure 4:
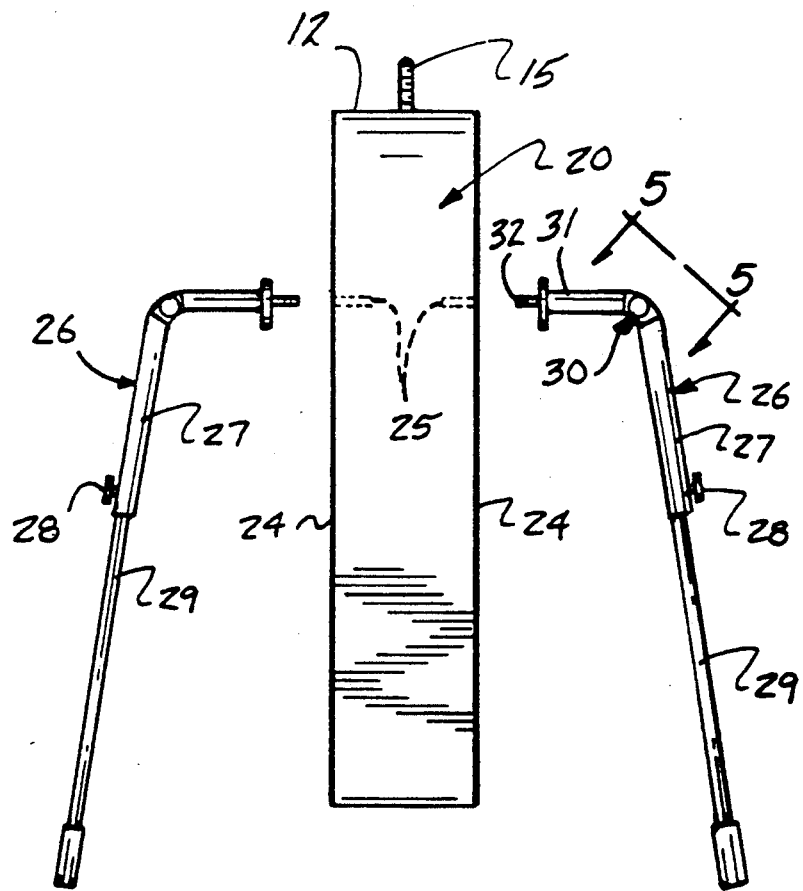
FIG. 4 is an orthographic side view of the invention.
Figure 5:
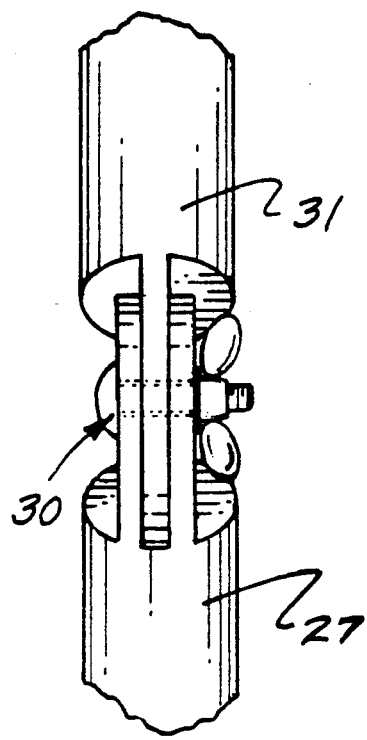
FIG. 5 is an orthographic view, taken along the lines 5—5 of FIG. 4 in the direction indicated by the arrows.

The FIG. 4 indicates the connecting plate side walls 24, each having a side wall internally threaded bore 25 that are coaxially aligned relative to one another to each threadedly receive a support leg 26 to permit free standing of the camera of the camera structure. The support legs 26 includes a base tube 27 having a base tube fastener 28 to engage an extension leg 29 telescopingly mounted within the base tube 27. A connecting leg 31 is pivotally mounted to the base tube 27 about a pivotal locking joint 30 of a type as indicated in FIG. 5, having a joint fastener directed between a bifurcated support of the base tube 27 and a flange received within the bifurcated support, with the flange mounted to the connecting leg 31. The connecting leg 31 further includes a threaded lock 32 arranged for threaded engagement within one of said internally threaded bores 25, in a manner as indicated in FIG. 4.

Figure 6:
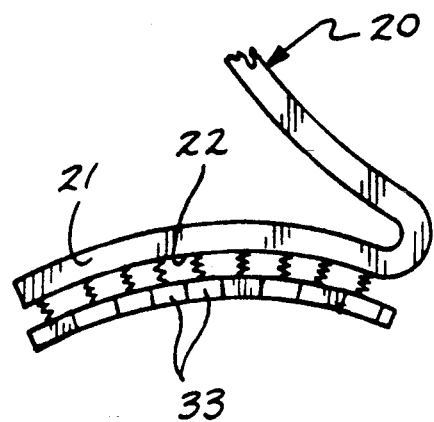
FIG. 6 is an orthographic view of the saddle plate employed by the invention.

The FIGS. 6–8 indicate the concave support surface 22 having a matrix of cushion plate members 33. Each of the cushion plate members 33 are of rigid construction, wherein plate member facing side walls 35 each include an interconnecting first spring 34. A second spring 36 is mounted orthogonally between each of the plate members 33 and to the concave support surface 22. In this manner, combination of various shapes of an individual's shoulder due to garments and the like worn by an individual are more readily accommodated in a shock absorbing convenient manner by the cushion plate structure 33.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letter Patent of the United States is as follows:

1. A camera shoulder rest for accommodating a camera rotatably thereon, wherein the rest comprises, a support plate, the support plate including a top wall spaced from and parallel a bottom wall, and a support plate bore orthogonally directed through the support plate extending through the top wall and through the bottom wall, and a fastener rod rotatably mounted within the support plate bore, the fastener rod including a fastener rod handle positioned in adjacency relative to the support plate bottom wall, with the fastener rod extending through the support plate beyond the top wall terminating in a threaded portion, with the fastener rod having a first collar positioned in adjacency to the top wall, and the fastener rod having a second collar positioned in adjacency to the bottom wall to rotatably position the fastener rod relative to the support plate, and a connecting plate fixedly and orthogonally mounted to the support plate extending from the support plate, and an arcuate saddle plate, with the connecting plate fixedly mounted to the arcuate saddle plate, with the connecting plate positioned intermediate the support plate, and the saddle plate having a concave support surface, and a convex top surface, with the connecting plate oriented medially of the convex support surface, and including cushioning means mounted to the concave support surface for accommodating an individual's shoulder within the cushion means, and the connecting plate includes connecting plate side walls, wherein each of the connecting plate side walls includes an internally threaded bore, with a plurality of support legs, wherein one of said support legs is mounted to one of said internally threaded bores, and each of the support legs includes a base tube, the base tube having a base tube fastener and an extension leg telescopingly received within the base tube, with the base tube fastener arranged for engagement of the extension leg, and a connecting leg, with a pivotal locking joint positioned intermediate the base tube and the connecting leg, with the pivot locking joint including a bifurcated support mounted to the base tube and a connecting flange mounted to the connecting leg, wherein the connecting flange is positioned within the bifurcated support, and the cushion means includes matrix of plate members, and adjacent plate members of the plate members each including facing side walls, wherein a first spring is mounted between the adjacent plate members extended between said facing side walls, and each of the plate members includes a second spring, with the second spring interconnecting each of said plate members to said concave support surface.

* * * * *